Oct. 16, 1956  C. H. HARRY ET AL  2,766,668
AUTOMATIC DEPRESSOR OF THE OPTICAL AXIS OF A GUN CAMERA
Filed Oct. 10, 1951  3 Sheets-Sheet 2
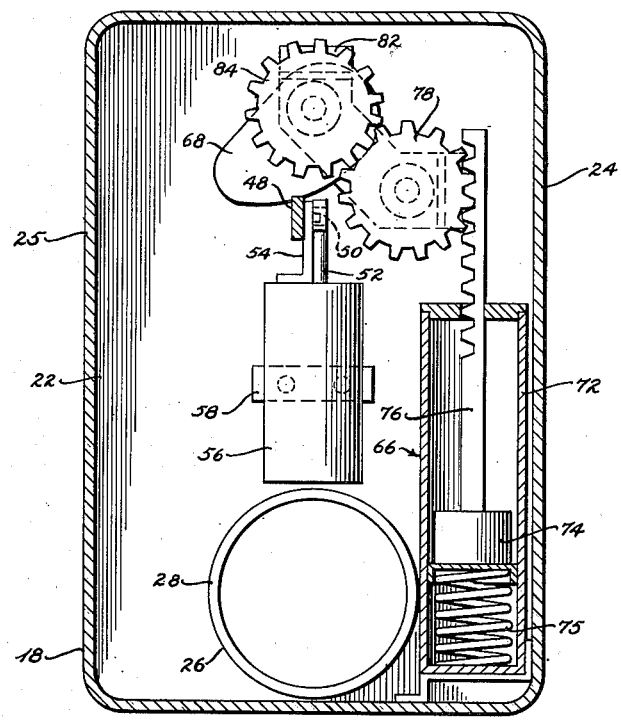
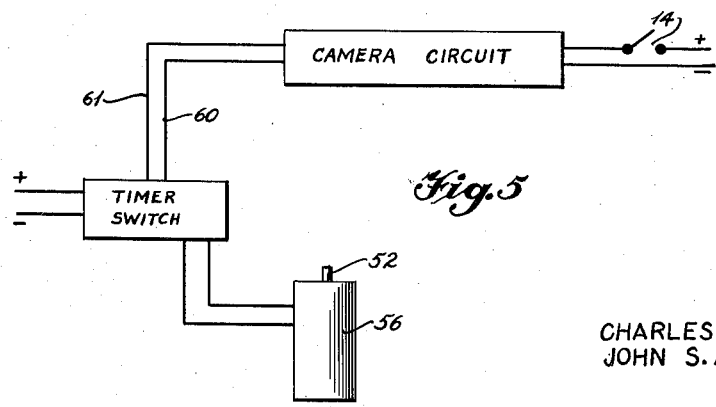
INVENTORS
CHARLES H. HARRY
JOHN S. ATTINELLO
BY
*Walter S. Paul*
ATTORNEY Oct. 16, 1956  C. H. HARRY ET AL  2,766,668
AUTOMATIC DEPRESSOR OF THE OPTICAL AXIS OF A GUN CAMERA
Filed Oct. 10, 1951  3 Sheets-Sheet 3

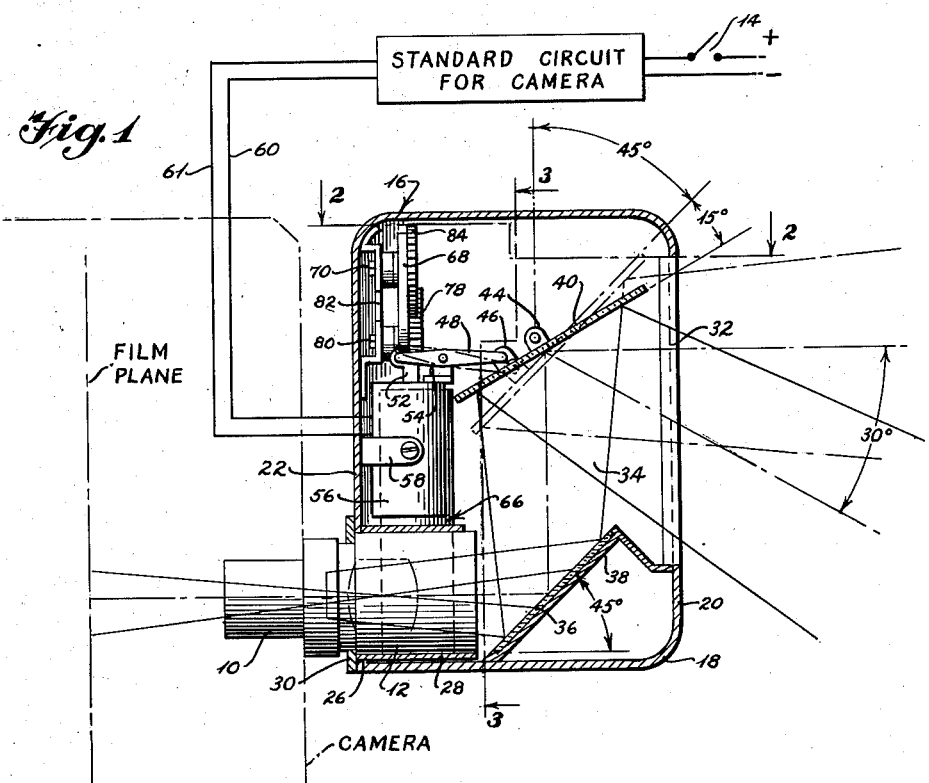

Inventors
CHARLES H. HARRY
JOHN S. ATTINELLO

By R. I. Tompkins
Attorneys

United States Patent Office 2,766,668
Patented Oct. 16, 1956

2,766,668
AUTOMATIC DEPRESSOR OF THE OPTICAL AXIS OF A GUN CAMERA

Charles H. Harry, Washington, D. C., and John S. Attinello, Arlington, Va., assignors to the United States of America as represented by the Secretary of the Navy Application October 10, 1951, Serial No. 250,776

6 Claims. (Cl. 95—12.5)

(Granted under Title 35, U. S. Code (1952), sec. 266)

This invention relates to improvements in aircraft gun camera operation and more particularly to an attachment for a gun camera which permits the angle of view of the camera to be temporarily depressed.

An object of the invention is to provide a gun camera attachment which permits the angle of view of the camera to be depressed automatically so that the pilot is not burdened with any additional controls to protograph the point of missile contact.

Another object of the invention is to provide such an attachment which may be applied to existing gun cameras without any appreciable modification of the camera or aircraft in which the camera is mounted.

A further object of the invention is to provide a gun camera attachment for depressing the optical axis of the camera, the attachment retaining the axis depressed an amount which is a function of the acceleration of the aircraft, and the attachment retaining the axis depressed that amount for a duration, after which the optical axis is returned to its normal position.

Other objects will become apparent in considering the description of the illustrated embodiments of the invention.

In the drawings:

Fig. 1 is a vertical sectional view of the attachment, showing it located on a standard aircraft gun camera, the electrical wiring and parts of the camera being shown schematically.

Fig. 2 is a transverse sectional view taken on the line 2—2 of Fig. 1 and in the direction of the arrows.

Fig. 3 is a vertical sectional view in enlarged scale taken substantially on the line 3—3 of Fig. 1 and in the direction of the arrows.

Fig. 4 is a perspective view of a part of a motor assembly used in the attachment.

Fig. 5 is a schematic view showing an alternate manner of electrical attachment of the device with the camera.

Figure 6:
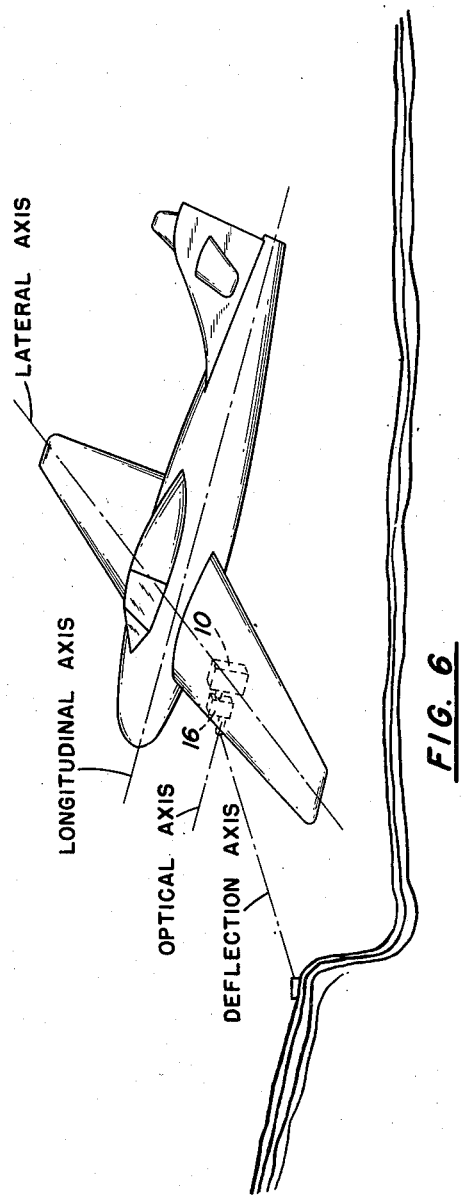
Fig. 6 is a perspective view showing the attachment and camera mounted in the wing of an aircraft and indicating how the optical axis of the camera is deflected from the normal due to the aircraft pulling up from a dive.

Although the invention is described in connection with an electrically operated gun camera, it is to be understood that other automatic controlled or manually operated cameras, either single-shot or otherwise, are practical in many instances and may have the present attachment used therewith.

Gun-camera records of ground-support operations from fighter aircraft firing rockets or discharging other missiles, proved to be of little assessment value because in the majority of cases the point of impact has been below the camera field of vision. Considerable effort is being directed to develop a gyro-stabilized camera to overcome this difficulty, but to date no feasible solution to the problem is evident. The weight, space requirement and complexity of such a system are factors appearing to render gyro systems prohibitive or at least impractical.

A system which is extremely simple from a mechanical and an operational standpoint is disclosed herein and as such, it is practical for aircraft use. The system is embodied in an attachment for existing gun cameras, which automatically—without pilot operation—depresses the optical axis of the camera while the aircraft on which the attachment is carried, pulls out of a dive or in some other way accelerates, whether the acceleration be negative or positive. Thus, the optical axis of the camera is normal during the rocket attack dive, i. e., it extends from the camera forwardly through the wing leading edge, but in the pull-up from the dive, the acceleration acting in the aircraft's vertical plane causes the optical axis to be deflected downwardly to permit the photographing of the point of impact.

In Fig. 1 a standard gun camera and its circuit are schematically shown. In addition to other structure the camera includes a barrel 10 having a lens shade 12. The standard circuit of one type gun camera is so arranged that when the pilot triggers his guns or rockets a switch 14 is actuated thereby causing the camera to be actuated, and the camera continues to operate for an over-run period, usually two to six seconds, after the pilot releases the trigger. However, during this period the pilot must bring his aircraft in a nose-up position and as a result the optical axis of the camera is shifted upwardly causing photographs to be taken not of the missile as it hits, but of some inconsequential area.

The attachment 16 for the camera automatically depresses the optical axis of the camera in order to overcome the problem presented in using the standard gun camera, as shown in Fig. 6. It is constructed of a housing 18 having a top and bottom together with walls 20, 22, 24 and 25. The wall 22 is provided with an opening 26 in which a sleeve 28 is secured, and this sleeve is adapted to contain the camera lens shade 12 so that the opening 26 is in alignment with the camera barrel 10. Suitable means, as the locking ring 30, are used to hold the housing 18 fastened to the camera barrel. A light aperture 32 is formed in the wall 20 and is at one end of a light passage 34, the other end being at the opening 26 of the lens in the barrel of the camera.

A first light reflecting member 36 is disposed in the light passage 34 of the housing 18 and is held fixed by suitable means, as the mounting bracket 38. A second light reflecting member 40 is located in the light passage but this member is mounted on aligned housing wall supported pivot assemblies 42 and 44 so that the member 40 is capable of being tilted or displaced pivotally. The member 36 is aligned with the opening 26 and the member 40, whereas the member 40 is aligned with the member 36 and the aperture 32. The angularity of the member 36 (45°) is suggestive, and the same holds true of the angularity of the member 40. The members 36 and 40 are preferably front-surfaced aluminized metal mirrors. This type of mirror is chosen to permit deflection of the camera optical axis without intoducing spherical or chromatic aberrations in the standard camera optical system, although other reflecting media may be used for the members 36 and 40.

The movable member 40 has an ear 46 fixed thereto accommodating one end of the rocker 48, this rocker constituting a portion of a means for shifting the member 40 about its pivot axis. The opposite end of the rocker 48 is disposed in a slot 50 which is formed in the upper end of a solenoid plunger 52 thereby forming a lost motion connection between the plunger 52 and the rocker 48. Rocker 48 is pivoted to a mounting bracket 54 whereby when the solenoid 56, which is carried in the housing by the support 58, is energized, the plunger pivots the rocker 48. This motion of the rocker imparts pivotal movement to the light reflecting member 40.

In operation of the described structure, after the switch 14 is closed, the wires 60 and 61 complete a circuit containing the solenoid 56. During the entire over-run period of the camera, the solenoid 56, which serves as a motor, remains energized thereby urging its plunger 52 outwardly. The movement of the plunger is transmitted through the rocker 48 to the member 40, one of a large number of possible second positions of the member 40 being shown in Fig. 1. The schematic light ray lines of Fig. 1 show the capability of the attachment to depress the optical axis of the camera through a range of 30°, although by shifting the member 36 and/or 40, or increasing the stroke of the plunger 52 the depression range may be increased or decreased.

In Fig. 5 a slightly modified arrangement for connection with the camera circuit is disclosed. Here, the camera circuit is used to energize a timer switch which serves as a relay, so that the duration of energization of the solenoid 56 may be varied by manual adjustment of the timer switch to the desired setting.

At the moment that the missile is released or fired from the aircraft the normal optical axis of the camera is proper for use in photographing. Therefore if the solenoid plunger 52 were permitted to operate the rocker 48 the full amount in accordance with the stroke of the plunger, the axis would be depressed too soon. Accordingly the attachment is provided with a device which provides a movable limit for the travel of the plunger 52, the movement of the limit being governed by the acceleration of the aircraft and hence the camera and/or the attachment 16. This device includes an accelerometer 66 (Fig. 3) mounted in the housing 18, together with a cam 68, which is mounted on a spindle 70. The accelerometer 66 consists of a tube 72 having a mass 74 disposed therein, and a spring 75 reacting on the mass and one end of the tube. The rod 76 has teeth formed in one edge of it and they are engaged with the teeth of a gear 78. A shaft 80 for the gear 78 may be mounted in the wall 22, as is the spindle 70, or, the mounting bracket 82 may be used for this purpose. The gear 78 is enmeshed with a gear 84, the latter being fixed to the spindle 70 so that the cam 68 and the gear 84 must move in unison. By positioning the cam 68 so that it contacts the outer end of the plunger 52 or the rocker 48, the cam will define the extent of movement of the member 40 by limiting the travel of the plunger 52.

As now seen, the spring biased mass and cam assembly materially modifies the operation of the attachment 16. When an aircraft approaches a target the acceleration of the aircraft is usually very low if not zero. Hence, after energization of the motor, the rod 76 will be in such position as to retain the cam 68 adjusted to allow little or no movement of the motor plunger 52. The result is the the optical axis of the camera is unchanged or shifted only slightly from the normal optical axis of the camera. However, with a change in direction of flight, the acceleration changes appreciably in value thereby causing the accelerometer to be actuated, rotating the cam through the gearing disclosed in Fig. 3, and lifting the lobe of the cam 68 away from the plunger 52 and/or rocker 48. In this way the plunger 52 increases its movement outwardly of the solenoid 56 distances which are functions of aircraft acceleration causing the reflecting member 40 to tilt thereby shifting the optical axis of the camera. The change of position of the cam and consequently the reflecting member 40, is a continuous, smooth operation allowing satisfactory photography by shifting the optical axis of the camera through angles whose values are determined by aircraft acceleration.

When using the attachment with a wholly mechanical and/or manually operable single shot or movie cameras, the motor 56 may be energized in a variety of ways, such as by use of a switch appropriately connected with the camera or a manually operable switch remote from the camera. Either of these switches would be of standard construction and arranged to open and close a circuit with the motor 56 in it.

The invention described herein may be manufactured and used by or for the Government of the United States of America for governmental purposes without the payment of any royalties thereon or therefor.

What is claimed is:

1. An attachment for an aircraft carried camera, said attachment comprising a housing having an opening for alignment with the camera barrel, a stationary light reflecting member in said housing, a movable light reflecting member in said housing, means for displacing said movable member, and means responsive to acceleration for limiting the extent of displacement of said movable member including an accelerometer, a cam rotatively carried by said housing, a drive connection between said accelerometer and said cam, and said cam contacting said displacing means to limit the extent of movement caused by said displacing means.

2. In an aircraft mounted camera which has an electrical circuit to operate the camera, a housing having an opening aligned with the barrel of the camera and a light aperture spaced from said opening, a fixed member having a reflecting surface in alignment with said opening, a second member having a reflecting surface in alignment with said aperture, said members being in alignment with each other, means displaceably mounting said second member within said housing, a motor assembly arranged to displace said second member, electrical connections between said motor and said circuit arranged to render said motor operative when said circuit is energized, an accelerometer disposed in said housing, a cam mounted for rotation in said housing, mechanical means drivingly connecting said accelerometer and said cam, said motor assembly including a rocker, and said cam being disposed in the path of movement of said rocker so as to limit the extent of movement of said rocker to thereby limit the displacement of said second member.

3. In combination with a gun camera barrel, an attachment comprising a housing having walls, said housing provided with a light aperture in one wall and a barrel opening in the opposite wall, means for fastening said housing to said barrel so that said opening is in alignment with said barrel, a first light reflecting member disposed in said housing in alignment with said opening, a second light reflecting member disposed in said housing in alignment with said aperture and said first member, means pivotally mounting said second member in said housing, means for pivoting said second member including a motor with a rocker connected thereto, said rocker being connected to said second member so that when said motor is actuated said second member is piovtally actuated thereby shifting the optical axis of said camera, an accelerometer disposed in said housing, a cam mounted for rotation in said housing and disposed in the path of movement of said rocker in order to limit the extent of travel of said rocker and said second member, and means operatively connecting said cam with said accelerometer whereby the extent of pivotal movement of said second member is a function of the shape of said cam and the extent of actuation of said accelerometer.

4. A camera for mounting in an airplane with its optical axis substantially parallel to the longitudinal axis of the airplane, an attachment for shifting said optical axis comprising a housing having a window in one side, an opening in the other side to receive the lens barrel of the camera, a pair of mirrors in the housing normally positioned to maintain said optical axis parallel to said longitudinal axis, one mirror being in a fixed position and the other mounted for pivotal movement about an axis substantially horizontally transverse to the longiudinal axis of the airplane, said pivotally mounted mirror acting to shift the light rays entering the lens barrel through said window, a spring biased mass coupled to said pivotally mounted mirror and movable along an axis normally perpendicular to both said optical axis and said transverse axis, whereby movement of said mass in opposition to the spring bias and in response to movement of said airplane in pulling out of a dive determines the position of said pivotally mounted mirror and thus the shifted position of said optical axis.

5. In an aircraft camera for mounting in an airplane with its optical axis normally substantially parallel to the longitudinal axis of the airplane, the combination of an attachment to shift said optical axis, said attachment comprising members having confronting reflecting surfaces, at least one member being in line with the camera lens axis and at least one member being pivotally mounted for movement about an axis perpendicular to said optical axis and parallel to the airplane lateral axis, means operatively connected to said pivotally mounted member for positioning said movable member in any one of a number of positions about its axis, said means comprising a spring biased mass mounted to move along an axis parallel to the airplane vertical axis upon rotation of the airplane about an axis parallel to its lateral axis, whereby a change in directional movement of the airplane causes movement of said mass in opposition to the spring bias.

6. In an aircraft camera for mounting in an airplane with its optical axis normally substantially parallel to the longitudinal axis of the airplane, the combination of an attachment to shift said optical axis, said attachment comprising members having confronting reflecting surfaces, at least one member being in line with the camera lens axis and at least one member being pivotally mounted for movement about an axis perpendicular to said optical axis and parallel to the airplane lateral axis, means for displacing said movable member about its axis, means responsive to acceleration forces caused by rotation of the airplane about an aixs parallel to its lateral axis for limiting the extent of displacement of said movable member, said last mentioned means comprising a spring biased mass mounted to move along an axis parallel to the aircraft vertical axis whereby a change in directional movement of the airplane causes movement of said mass in opposition to the spring bias.

References Cited in the file of this patent

UNITED STATES PATENTS

| 1,953,304 | Lutz | Apr. 3, 1934 |
| 2,142,350 | Drakoff | Jan. 3, 1939 |
| 2,480,867 | Maris | Sept. 6, 1949 |
| 2,544,686 | Jensen | Mar. 13, 1951 |

FOREIGN PATENTS

| 958,615 | France | Sept. 19, 1949 |